United States Patent [19]

Voss

[11] Patent Number: 5,044,058

[45] Date of Patent: Sep. 3, 1991

[54] BULB INSERTION AND REMOVAL TOOL

[76] Inventor: Barbara A. Voss, 2625 N. 118th St., Wauwatosa, Wis. 53226

[21] Appl. No.: 397,822

[22] Filed: Aug. 24, 1989

[51] Int. Cl.[5] .............................................. B23P 19/02

[52] U.S. Cl. ...................................................... 29/278

[58] Field of Search .................. 29/270, 278, 280, 267, 29/268, 282, 741, 758, 764; 254/28; 81/3, 8; 294/99.1, 99.2

[56] References Cited

U.S. PATENT DOCUMENTS

| | | | |
|---|---|---|---|
| 673,191 | 4/1901 | Arthur . | |
| 1,166,189 | 12/1915 | Darby . | |
| 1,726,465 | 8/1929 | Bird . | |
| 3,100,324 | 8/1963 | Tutino et al. . | |
| 3,215,006 | 11/1965 | Urani . | |
| 3,494,591 | 2/1970 | Fleming | 254/28 |
| 3,654,824 | 4/1972 | Reed . | |
| 4,057,886 | 11/1977 | Brass | 29/280 |
| 4,155,159 | 5/1979 | Hogan et al. . | |
| 4,244,094 | 1/1981 | Rucinski . | |
| 4,389,912 | 6/1983 | Dallons et al. . | |
| 4,475,283 | 10/1984 | Olson et al. . | |
| 4,541,311 | 9/1985 | Trammell . | |
| 4,841,819 | 6/1989 | Williams | 29/278 |

*Primary Examiner*—Robert C. Watson
*Attorney, Agent, or Firm*—Wheeler Law Firm

[57] ABSTRACT

A tool for inserting or removing generally small Christmas tree light bulbs into or from their sockets. The tool comprising a pair of opposed levers and a fulcrum. The levers meet at one end forming the fulcrum. The ends of the levers are free at the other end. The free-ends of the levers are wedgelike and semi-circular in shape; so they can grab a Christmas tree light bulb and remove it. The fulcrum has a hole designed to gently hold a Christmas tree light bulb for insertion into a socket.

13 Claims, 2 Drawing Sheets

BULB INSERTION AND REMOVAL TOOL

BACKGROUND OF THE INVENTION

The use of electric colored lights on Christmas trees is a popular practice. Such lights come in many different shapes and sizes. When Christmas tree lights burn out, the larger light bulbs, after being allowed to cool, are easily grasped and removed from their sockets and replaced. However, the smaller the light bulb, the harder it is to get a grip on it and remove it from its socket. This also makes it hard to grasp when plugging a small light bulb into a socket. The problems involved are that the structure of the light bulb is fragile and the force required to remove it from its socket is sometimes greater than the light bulb can withstand. The area which is the most sturdy on a small Christmas tree light bulb, its base where it connects with the socket, is the most difficult to grasp. This is especially true when the light is on the Christmas tree and surrounded by sharp pine needles. Even a small bulb is quite hot unless substantial cooling time is allowed.

The device of this invention is a unique and simple tool that can reach in and firmly grasp a Christmas tree light around its base without having to apply force to the delicate light bulb structure itself, avoiding the majority of the pine needles that guard the light bulb, allowing the bulb to be removed without having to wait for it to cool. This makes removal of the light bulb from its socket a simple easy process. Another device on the tool allows the delicate structure of the light itself to be gently, but firmly, held as it is placed into a socket on or off the Christmas tree.

The inventor knows of no prior art which is designed for the particular purpose of removing small Christmas tree light bulbs from their sockets and replacing them. However, U.S. Pat. Nos. 673,191 (D. H. Arthur) and 1,166,189 (A. W. Darby) do show devices designed to remove large light bulbs from their sockets by grasping them and unscrewing them. The device of the present invention is designed to unsnap the bulb from the socket, grasp it, pull the bulb free from the socket, and then replace the bulb that was in the socket by snapping another bulb into the socket. U.S. Pat. No. 3,215,006 (A. Urani) shows a device designed to remove fuses from electrical devices and circuits. The device in the Urani patent accomplishes this by grasping the cylindrically shaped fuse either by its length or by its breadth. However, the Urani device is not designed to pull out an object like a Christmas tree light bulb that has been snapped into a socket because the device has no wedge-like projections to gently pull the light out of the socket to enable the grippers to grasp the base of the light bulb as does the present invention.

Other references are U.S. Pat. Nos. 4,244,094 (Rucinsky); 1,726,465 (B. E. Bird); 4,389,912 (Dallons et al), 3,100,324 (Tutino et al); 3,654,824 (Reed); 4,155,159 (Hogan et al); 4,475,283 (Olson et al); and 4,541,311 (Trammell, Jr.).

SUMMARY OF THE INVENTION

The present invention is a tool of unique and simple design for the installation and/or removal of small Christmas tree light bulbs from or into their sockets. The invention in its preferred form is a device comprising a pair of arms or levers joined at one end. The end comprising a fulcrum. The levers are deflectable toward and away from each other. The other ends of each of the levers are free. Finger grips are located on each lever to facilitate manipulation of the levers and wedge-like projections are located on the free end of each lever and pointed toward each other. The projections move with the levers as they are manipulated manually, and the wedges are adapted to engage that portion of an electrical light bulb in contact with the light bulb socket to enable removal of the light bulb from the socket. The tool has a hole in the fulcrum or fulcrum area with resilient plastic projections which are attached to the inside of the hole to facilitate holding the light bulb by friction as it is engaged for insertion into a receiving electrical socket. If preferred a foam washer rather than resilent plastic projections may be used. These and other benefits of the present invention will be apparent to one skilled in the art from the following description.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment is described, the details may be changed without departing from the invention, which is defined by the claims.

FIGS. 1-5 show the basic structure of the invention. FIGS. 6-10 show additional structure that is designed to increase the utility and manufacturability of the invention.

Figure 1:
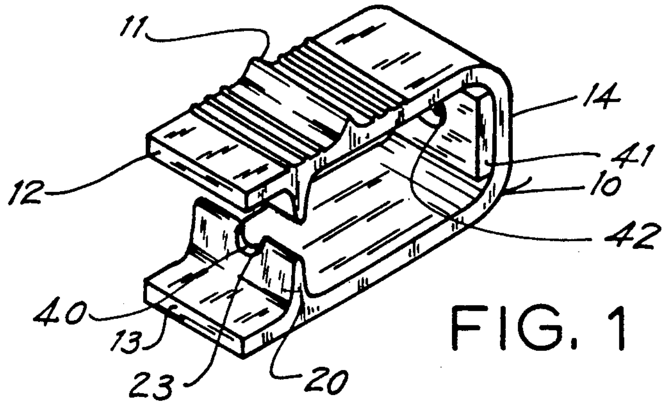
FIG. 1 is a perspective view of the light insertion and removal tool.

FIG. 1 shows a perspective view of the light bulb insertion/removal tool 10. The tool 10 comprises a set of finger grips 11, two levers 12 and 13, a fulcrum 14, a set of light bulb grippers 20, an opening 40 for holding the light bulb 30 that is to be removed and a foam washer 41 to gently hold the light bulb 30 that is to be inserted. The general shape of the light bulb insertion/removal tool 10 is that of a U. The base of the U is the fulcrum 14 and the arms of the U are the levers 12 and 13.

Figure 2:
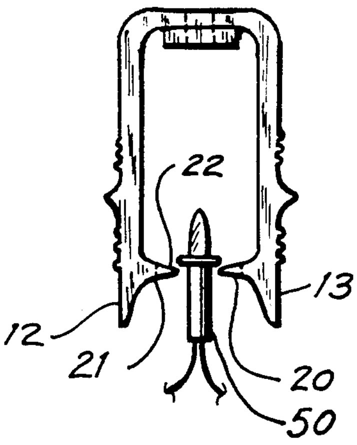
FIG. 2 is a side elevational view

The light bulb grippers 20, as illustrated in FIG. 2, are located at the free ends of the levers 12 and 13. There is one light bulb gripper at the end of each lever 12 and 13. The light bulb grippers 20 are generally wedge shaped devices. The thick end 21 of each gripper is attached to one of the levers 12 or 13. The thin ends 22 of the grippers 20 face and correspond to each other. The thin end 22 of each gripper is generally shaped in the form of a crescent; as illustrated in FIG. 1. The horns 23 of the crescent are the ends of the arcuate segment that forms the thin end 22 of the gripper. The area 24 between the horns 23 is concave and semi-circular to generally conform to the curvature of the light base 32. The horns 23 of the grippers 20 act as prongs, as the levers 12 and 13 are displaced towards each other.

Figure 3:
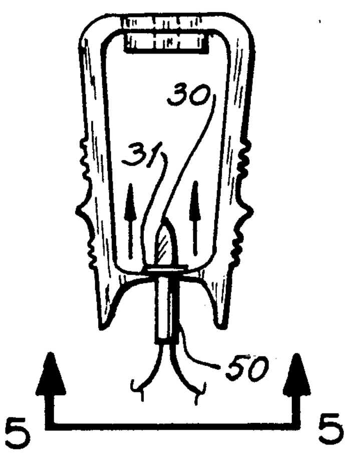
FIG. 3 is a side elevational view showing the light bulb insertion and removal tool removing a Christmas tree light bulb.
Figure 5:
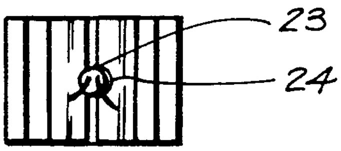
FIG. 5 is a view from line 5—5 of FIG. 3.

In use, the horns 23 are pushed into the space between, the lip 31 of the light bulb base 32 and the light socket 50. The semi-circular area 24 allows the horns 23 to grasp the base of the light 32 and firmly hold the light base 32, so that the light bulb 30 may be removed from the socket 50; as illustrated in FIG. 3 and FIG. 5.

Figure 4:
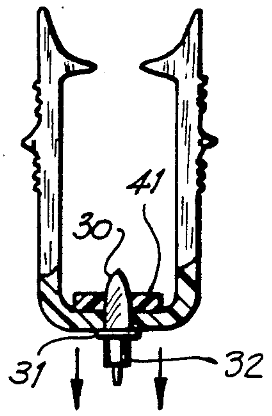
FIG. 4 is a side elevational view showing how the light bulb insertion and removal tool holds a Christmas tree light bulb that is to be plugged into a Christmas tree light bulb socket.

The means by which the Christmas tree light bulb 30 may be inserted into the socket 50 are illustrated in FIGS. 1 and 4. The figures show a hole 42 at the base of the light removal/placement tool 10. The hole 42 is slightly larger than the diameter of the light bulb 30.

The finger grippers 11 on each lever 12 and 13 allow the tool 10 to be used in either direction; i.e. for removing or replacing a light out of or into the socket 50. FIG. 4 shows the light 30 being placed into the socket 50 as it is held in the hole 42 by the gentle but firm pressure of the foam washer 41.

After the burnt out Christmas tree light bulb has been removed a new bulb may be inserted. The new bulb 30 is placed into the hole 42. The resilience of the foam washer 41 provides enough pressure to hold the light bulb 30 in place. The light bulb 30 is then snapped into the light bulb socket 50. The pressure exerted upon the light bulb 30 by the washer 40 is not enough to unsnap the bulb 30 from the socket 50. Therefore, the tool 10 may be pulled away from the light bulb 30 and the light bulb 30 will be left inserted in the socket 50.

FIGS. 6–10 essentially disclose the same device as FIGS. 1–5 except that the device disclosed in FIGS. 6–10 also shows the lock corners 70 and 80 and gripper knobs 410. The lock corners 70 and 80 are comprised of key projections 71 and 81 attached respectively to the bases 25 and 26 of the levers 12 and 13 and a key way 72 and 82 respectively on ends 27 and 28 of the fulcrum 14. The bases 25 and 26 are directly attached to the ends 27 and 28 by the thin flexible strips 73 and 83; please see FIG. 10.

The purpose of the lock corners 70 and 80 is two-fold. First, the design allows the tool 10 to be easily molded in a linear mold. This allows for a simplified manufacturing process. Second, the lock corners 70 and 80 allow the tool 10 to be more easily stored by allowing the user to straighten the tool 10 out so that it will not take up any more storage space than a knife or a screw driver. When not in storage the user may easily assemble the tool 10 by snapping the key projections 71 and 81 into their respective key ways 72 and 82 and then proceed to use the tool 10.

Figure 6:
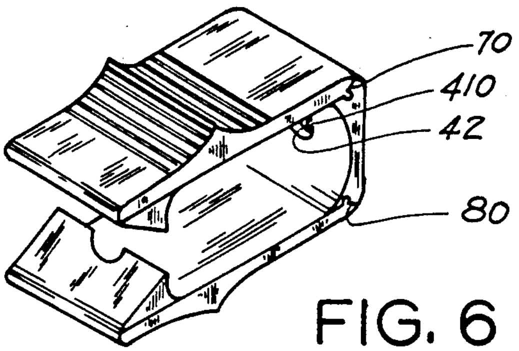
FIG. 6 is a perspective view of a second embodiment showing the relationship of the light bulb insertion hole, the plastic projections, the finger grips and the light bulb grippers.
Figure 7:
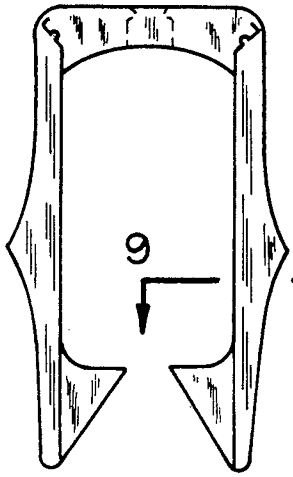
FIG. 7 is a side elevational view of the FIG. 6 embodiment.
Figure 8:
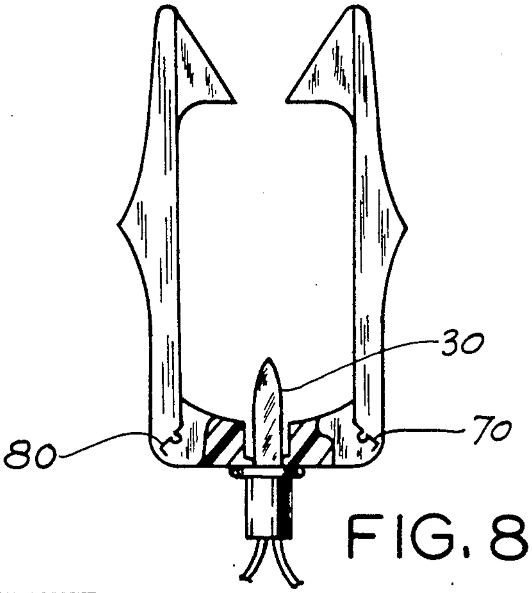
FIG. 8 is a side elevational view of the FIG. 6 embodiment showing the light insertion tool removing a Christmas tree light bulb.
Figure 9:
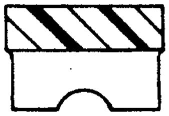
FIG. 9 is a view on line 4—4 of FIG. 7.
Figure 10:
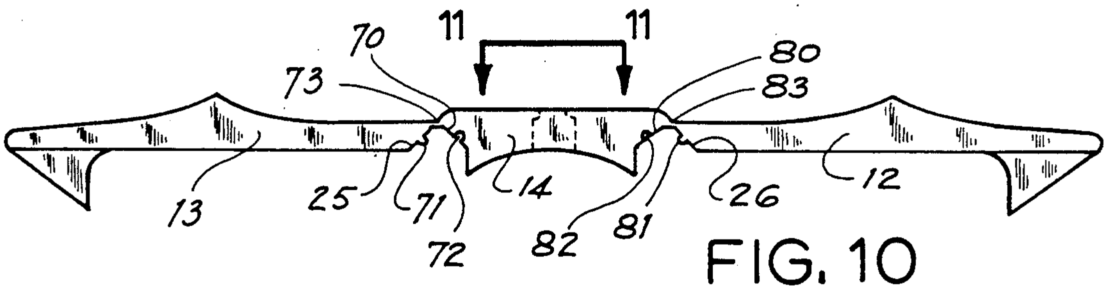
FIG. 10 is a side elevational view of the FIG. 6 embodiment showing the locking corners of the light insertion tool.
Figure 11:
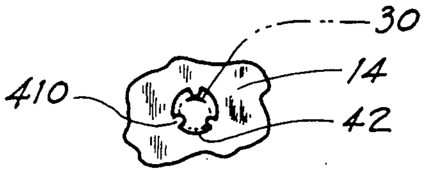
FIG. 11 on line 11—11 of FIG. 10 shows the bulb gripper knobs of the FIG. 6 embodiment.

The gripper knobs 410, disclosed in FIGS. 6 and 11, line the hole 42. These knobs 410 are used rather than the foam washer 41 shown in FIGS. 1–5 to gently grip the bulb as it is inserted. By using the gripper knobs 410 in the design the entire tool may be manufactured in one step.

The above described embodiments of this invention are merely descriptive of its principles and are not to be limiting. The scope of this invention instead shall be determined from the scope of the following claims, including their equivalents.

What is claimed is:

1. A hand operated tool for the removal and replacement of Christmas tree light bulbs which have a glass bulb and smaller adjacent bases insertable into bulb sockets, comprising;

a pair of opposed levers;

connecting means moveably connecting the levers for movement toward and away from each other;

a pair of opposed wedge means at respective and corresponding ends of each said lever having circularly relieved edges tapering to thin edges for wedging and gripping a light bulb while it is in a bulb socket and dimensioned to continue to close after said wedge means contact said glass bulb and said socket until said thin edges grip said base;

whereby the levers may be moved towards each other carrying the thin edges of the opposed wedge means against the area where the glass bulb and the light bulb socket meet to wedge the glass bulb and attached base outward with respect to said socket and separate the base of the light bulb from the socket while grasping the base of the light bulb and holding the light bulb securely and firmly thereby allowing the light bulb to be removed from its socket.

2. The device of claim 1 in which the pair of opposed wedging means for wedging and gripping a light bulb at corresponding ends of each said lever are inclined planes each having a thinnest portion opposed to the thinnest portion of the other member of the pair;

each said thinnest portion of each said wedge being an edge;

the center of each said edge being the area which is relieved to be generally semi-circular;

said relieved edge generally conforming to the surface contour of the base of a light bulb;

said relieved edge of each said thinnest portion having two ends forming two horns;

said horns being able to engage the space between the glass bulb of the light bulb and the light bulb socket;

whereby the pressure applied to said opposing levers across said connecting means causes said horns to squeeze between the lip of the light bulb base and the socket edge, thereby grasping the light bulb base and allowing the light bulb to be pulled free from the socket.

3. The device of claim 1 in which the connecting means is a fulcrum.

4. A hand operated tool for the removal and replacement of Christmas tree light bulbs which have a glass bulb and smaller adjacent bases insertable into bulb sockets, comprising:

a pair of opposed levers;

connecting means movably connecting said levers for movement toward and away from each other;

a pair of opposed wedge means at respective and corresponding ends of each said lever having relieved edges for wedging and gripping a light bulb while it is in a bulb socket;

said connecting means being a fulcrum;
said fulcrum having an opening;
said opening having flexible means;
whereby the light bulb may be inserted into said opening and said flexible means gently hold the glass portion of the light bulb as the light is plugged into the socket.

5. A hand operated tool for the removal and replacement of Christmas tree light bulbs which have a glass bulb and smaller adjacent bases insertable into bulb sockets, comprising:
a pair of opposed levers;
connecting means movably connecting said levers for movement toward and away from each other;
a pair of opposed wedge means at respective and corresponding ends of each said lever having relieved edges for wedging and gripping a light bulb while it is in a bulb socket;
said connecting means being a fulcrum;
said fulcrum having an opening;
said opening being lined with a foam washer;
whereby the light bulb may be inserted into the opening and said form washer gently holds the glass portions of the light bulb as the light is plugged into the socket.

6. A hand operated tool for the removal and replacement of Christmas tree light bulbs which have a glass bulb and smaller adjacent bases insertable into bulb sockets, comprising;
a pair of opposed levers;
connecting means including a fulcrum moveably connecting the levers for movement toward and away from each other;
a pair of opposed wedge means at respective and corresponding ends of each said lever having relieved edges for wedging and gripping a light bulb while it is in a bulb socket;
each said wedge having a thin end and a thick end;
said thick end of each said wedge being generally integral with a corresponding end of each said lever;
each said thin end having an edge;
each said edge being generally semi-circular in shape;
said edge generally conforming to the contour of the surface of the base of the light bulb;
said semi-circular edge forming two horns;
said horns being able to engage the space between the lip of the light bulb base and the light bulb socket;
said fulcrum containing a bulb receiving opening;
said opening having flexible bulb-gripping projection means extending slightly into said opening;
whereby a Christmas tree light bulb may be removed from its socket by displacing the two levers towards each other, the horns of the semi-circular edge into the space between the lip of the light bulb base and the light socket, allowing the horns of the semi-circular edge to gently but firmly grasp the curved sides of the base of the light bulb and the light bulb to be removed from its socket; and
whereby a new light may then be placed into the hole in the fulcrum gripped by and the plastic projections to gently hold the glass surface of the light bulb as it is plugged into the socket.

7. A hand operated tool for the removal and replacement of christmas tree light bulbs which have a glass bulb and a smaller adjacent base insertable into bulb sockets, comprising:
a pair of opposed levers each having a free end and a non-free end;
connecting means moveably connecting the levers for movement of the free ends toward and away from each other;
a pair of opposed wedge means at respective said free ends of each said lever having relieved edges for wedges and gripping a light bulb while it is in a bulb socket;
said wedge means corresponding to each others position on each said lever;
said levers being attached to said connecting means at lock corners;
each said lock corner being formed by the connection of one said non-free end of said lever with one end of said connecting means;
each said non-free end of said lever having key means;
each said end of said connecting means having key way means;
said key means being capable of fitting tightly into said key way means.

8. The device of claim 6 in which each said non-free end of each said lever is attached to each said end of said connecting means by integral thin flexible means.

9. The device of claim 6 in which connecting means is a fulcrum.

10. The device of claim 6 in which said key way means are receptacles into which said key means snap into and are held in place.

11. The device of claim 6 in which said tool is made of plastic.

12. The device of claim 11 in which device is molded in a linear mold.

13. A hand operated tool for the removal and replacement of Christmas tree light bulbs which have a glass bulb and a smaller adjacent base insertable into bulb sockets, comprising:
a pair of opposed levers each having a free end and an attached end;
connecting means movably connecting the said attached ends of the levers for movement of the free ends toward and away from each other;
a pair of opposed wedge means near said respective said free ends, having relieved edges for gripping a light bulb in a socket;
said levers being attached to said connecting means at lock corners by integral thin flexible means;
each said lock corner being formed by the connection of one said attached end of each said lever with one end of said connecting means;
each said attached end of said lever having key means;
each said end of said connecting means having key receiving means;
said key means being capable of fitting tightly into said key way means;
each said wedge means having a thin end and a thick end;
said thick end of each said wedge means being integral with a corresponding said free end of each said lever;
each said thin end having a generally semi-circular edge;
each said edge generally conforming to the surface contour of the light bulb base;
each said semi-circular edge forming two horns;
said horns being able to engage the space between the lip of the light bulb base and the light bulb socket;
said connecting means containing an opening;
said opening having flexible plastic bulb gripping projection means.

* * * * *